June 25, 1957 J. M. CLAUSER ET AL 2,796,664
DENTAL ENGINE STRUCTURE
Filed Oct. 30, 1953
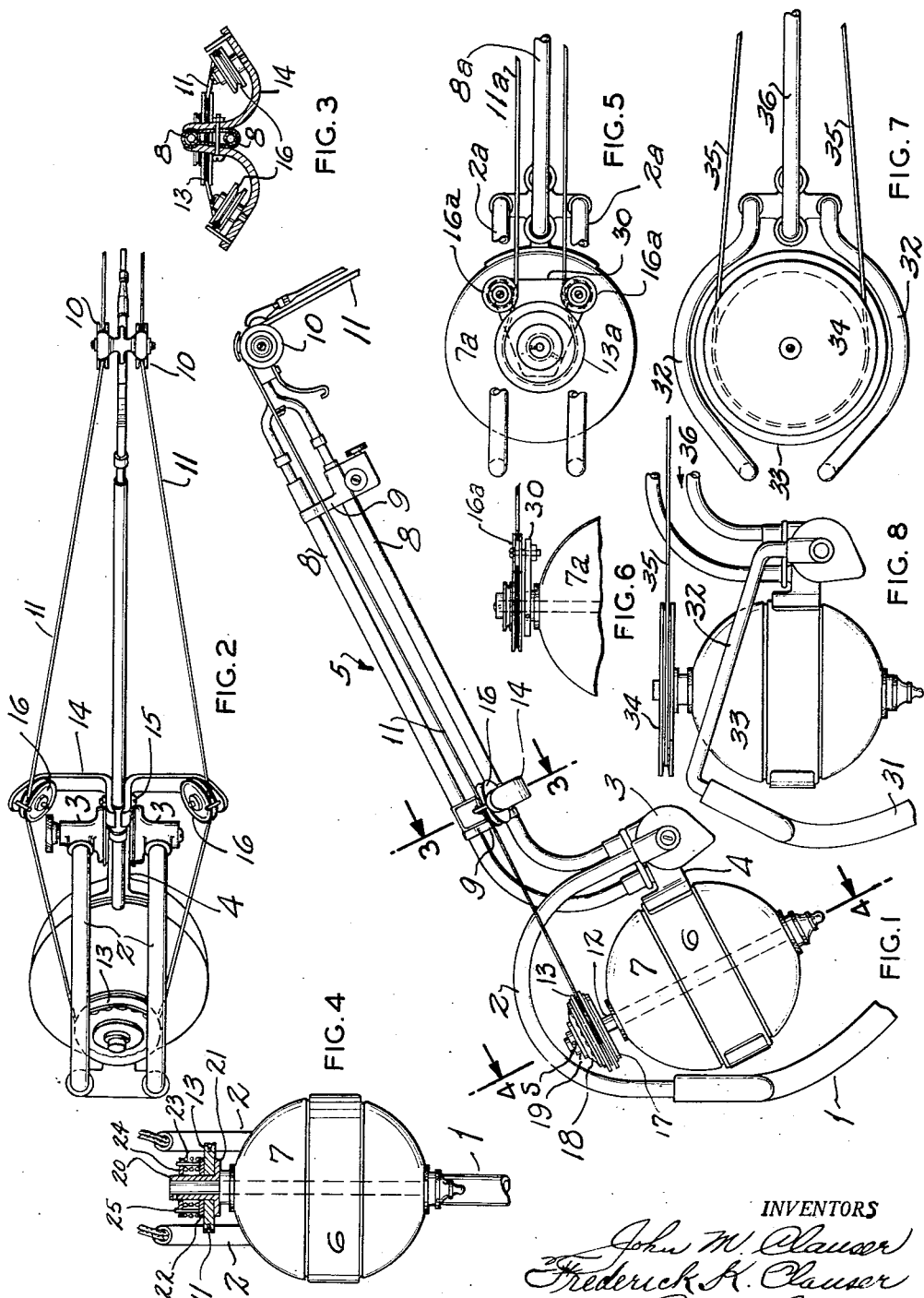
INVENTORS
John M. Clauser
Frederick K. Clauser
By Rodney Bedell
atty.

United States Patent Office 2,796,664
Patented June 25, 1957

2,796,664

DENTAL ENGINE STRUCTURE

John M. Clauser and Frederick K. Clauser, St. Louis, Mo., assignors to Midvale Dental Supply Company, St. Louis, Mo., a corporation of Missouri Application October 30, 1953, Serial No. 389,348

9 Claims. (Cl. 32—24)

The invention relates to dental engines and more particularly to adapting engines now generally in use for operation at higher speed than has been customary.

The advantages of operating dental tools such as burs and discs at speeds substantially greater than the 6000 to 8000 R. P. M. are being recognized and are discussed at length in an article by Doctors Ingraham and Tanner in the September 1953, Journal of the American Dental Association and manufacturers are furnishing dental engines arranged to operate at the higher speeds desired, but there are thousands of slower speed dental engines in use and in good condition. It is the primary object of the present invention to adapt such engines for operation at higher speeds than contemplated when they were manufactured. A substantial increase in the motor speed can be effected by opening the shunt resistance across the armature of the driving motor in a dental engine, but a desirable further increase in speed can be obtained by mounting a larger diameter driving pulley on the motor shaft. This expedient however is not readily adopted because the motor is mounted on a frame consisting of a pair of arms partially enclosing the motor and spaced from each other at the level of the driving pulley a distance greater than the diameter of the drive pulley initially furnished with the machine but less than the larger diameter of a driving pulley which may be applied to the motor to provide a desired speed of the dental tool.

The present invention resides in a simple alteration or addition to the present dental engines which, at a minimum of expense, will enable the engine motor to utilize a pulley of substantially greater diameter than previously used and thereby operate the dental tool at greatly increased speeds.

In the accompanying drawings illustrating selected embodiments of the invention:

Figure 1 is a side elevation of the upper portion of a frame yoke, a swinging bracket mounted thereon, an electric motor, and parts driven thereby, the motor being provided with an enlarged driving pulley and the bracket being provided with idlers making possible the use of the pulley.

Figure 2 is a top view of the structure shown in Figure 1.

Figure 3 is a substantially vertical section taken on the line 3—3 of Figure 1.

Figure 4 is a substantially vertical section taken on the line 4—4 of Figure 1, but showing another friction drive.

Figure 5 corresponds generally to the left hand end of Figure 2 but illustrates another form of the invention.

Figure 6 is a partial side view of the structure shown in Figure 5.

Figure 7 corresponds to Figure 5 but illustrates another form of the invention.

Figure 8 is a side view of the structure shown in Figure 7.

The engine frame includes a pedestal, not shown, which mounts a support yoke 1 comprising a pair of semi-circular tubular members 2 spaced apart transversely of their length, as shown in Figures 2 and 4, and terminating in bearings 3, which pivot an elongated swinging bracket having a short arm 4 at one side of the pivot bearing and a long arm 5 at the other side of the pivot bearing. Arm 4 comprises a band 6 forming part of or enclosing a motor housing 7 positioned within the semicircle formed by members 2. Arm 5 comprises a pair of relatively long parallel rod or tubular members 8 disposed in the same vertical plane one above the other but spaced apart and connected near the opposite ends of the arm by transverse ties 9 to provide substantial rigidity. The outer end of arm 5 mounts a pair of sheaves 10 for the driving belt 11. All of the above described structure is in general use.

The motor shaft 12 mounts a driving pulley 13 having a diameter greater than the distance between members 2 and approximately twice the diameter of pulleys generally furnished engines of this type as originally manufactured.

Accordingly the driving belt 11 cannot run from the driving pulley direct to sheaves 10 as originally contemplated because of the spacing of its flights near the pulley and the spacing of members 2. To obviate this difficulty, there is applied to bracket arm 5 a strap or pair of straps 14, secured to members 8 by a clamping screw 15, and mounting at their outer ends a pair of idlers 16 preferably inclined in planes disposed at angles to the planes of driver pulley 13 and sheaves 10.

This simple arrangement makes it possible for belt 11 to bypass members 2 and to be driven directly by a large diameter pulley on the motor shaft. Preferably pulley 13 is driven by a friction clutch comprising a disc 17 fixed on shaft 12 and a spring plate 18 seated against a collar 19 threaded on shaft 12 and held in adjusted position by a set screw S. This friction drive makes it possible for the operator to avoid damage by the tool (not shown) because of the increased ratio of the drive pulley to the driven pulley on the tool.

Another form of friction clutch is shown in Figure 4 in which a sleeve 20 is fixed on shaft 12 and has an integral disc 21 at its inner end opposing one face of pulley 13. A loose disc 22 opposes the other face of pulley 13 and is thrust against the same by a plurality of springs 23 seated on a disc 24 secured to sleeve 20. Pins 25 fixed on disc 22 and slidable through disc 24 cause discs 22 and 24 to move in unison and prevent springs 23 from buckling. If preferred, a single large diameter coil spring surrounding sleeve 20 may be substituted for the plurality of springs 23.

Figures 5 and 6 illustrate another form of the invention in which the motor housing 7a mounts a stationary plate 30 on which are journaled a pair of idlers 16a in close proximity to the drive pulley 13a and the driving belt 11a, after passing around pulley 13a, is brought to the inside edges of idlers 16a and thus between the spaced members 2a of the support yoke and the belt flights then extend parallel to bracket members 8a direct to the sheaves at the end of the arm, not shown.

Figures 7 and 8 illustrate another form of the invention in which the yoke usually furnished with a dental engine of the type described is replaced by a yoke 31 having spaced terminal members 32 which, instead of being disposed in a semi-circular arc in a substantially vertical plane are curved in a plane slightly inclined to the horizontal, as best seen in Figure 7, so as to partially surround the upper portion of the motor housing 33 when the latter is swung to the uppermost normal operating position, as indicated in Figure 8.

The diameter of the circle formed in part by the arcuate members 32 corresponds to or exceeds the diameter of the motor housing and accordingly the driving pulley 34 can have a diameter substantially larger than the driving pulleys 13 and 13a, as the driving belt 35 passes above all parts of the support yoke, including its members 32, on its path to the sheaves (not shown) at the outer end of bracket arm 36.

Each form of the invention described obtains the objectives stated in the introductory portion of the specification simply and inexpensively by making it possible to operate the tools of dental engines now in extensive use at speeds far above that for which they were designed when made and sold.

The structures described are illustrative and may be varied without departing from the spirit of the invention and the exclusive use of those modifications coming within the scope of the claims is contemplated.

What is claimed is:

1. In a dental engine including a frame with elongated parts extending alongside of each other but spaced apart, there being an elongated bracket extending between said frame parts and having a pivot thereon, and a motor carried by said bracket at one side of said pivot, and belt guiding sheaves carried by said bracket at the other side of said pivot, and spaced apart a distance less than the distance between said frame parts, a drive pulley mounted on the motor shaft and rotating in a plane intersecting portions of said frame parts and having a diameter corresponding to the distance between said frame parts, and a belt having flights passing over said pulley and said sheaves and clearing said frame parts, there being elements on the bracket near said frame parts deflecting the belt flights away from each other outwardly of the frame parts.

2. A dental engine as described in claim 1 in which the mounting of the drive pulley on the motor includes a friction connection between the motor shaft and the pulley providing for slippage of the pulley relative to the motor shaft under abnormal load.

3. In a dental engine having a frame with elongated parts extending alongside of each other but spaced apart, and having an elongated bracket member extending between said frame parts and pivoted thereon between the ends of the bracket with one end of the bracket mounting a motor and with the other end of the bracket mounting belt guiding sheaves spaced apart transversely of the bracket a distance less than the distance between said frame parts, a drive pulley on the motor having a diameter greater than the distance between said frame parts, a belt passing over said pulley and said sheaves, and idlers mounted on one of said members and guiding said belt in a path spaced from said frame parts.

4. A dental engine as described in claim 3 in which the idlers are spaced apart transversely of the belt flights with their outer edges spaced apart a greater distance than the over-all distance across the frame member parts and engaging the belt to thrust the belt flights away from each other to clear the frame member parts.

5. A dental engine as described in claim 3 in which the idlers are spaced apart transversely of the belt flights with their inner edges spaced apart a less distance than the distance between the frame member parts and thrusting the belt flights towards each other to clear the frame member parts.

6. In a dental engine, support arms comprising spaced parts in parallel relation, swinging arm structure pivotally mounted near one end of said support arms and provided with small diameter belt guiding sheaves at its other end, a motor structure mounted on said swinging arm structure abreast of said spaced parts and including a drive pulley of greater diameter than the distance between said parts, there being a pair of idler pulleys journaled on one of said structures with their belt contacting surfaces spaced apart a distance differing from the diameter of said driving pulley and from the distance between said parts and from the distance across said support arms.

7. In a dental engine, a support frame including spaced parts extending alongside each other, a motor with a drive pulley and provided with a housing pivoted on the ends of said parts, the space between said frame parts being widened adjacent to the motor pivot to accommodate the passage of the drive pulley between said parts as the motor housing is swung on its pivot.

8. In a dental engine, a support structure including spaced arms, a bracket pivoted on said arms, a motor including a housing mounted on said bracket at one side of said arms, and belt-guiding sheaves mounted on said bracket at the other side of said arms, a driving pulley on said motor having a diameter greater than the distance between said spaced arms, a plate on said housing, and idler pulleys on said plate between said driving pulley and said guiding sheaves, said idler pulleys being spaced apart transversely the length of a line between said driving pulley and said guiding sheaves and having their adjacent edges spaced apart a less distance than the distance between said support arms.

9. A dental engine as described in claim 1 in which the belt is guided between said pulley and sheaves by idler pulleys carried on the bracket between its pivot and the guiding sheaves and disposed transversely of the length of the bracket, the outer edges of the sheaves being spaced apart a greater distance than the distance between the spaced parts of the frame.

References Cited in the file of this patent
UNITED STATES PATENTS

| 1,040,577 | Reper et al. | Oct. 8, 1912 |
| 1,224,395 | Lyon | May 1, 1917 |
| 1,340,908 | Pieper et al. | May 25, 1920 |
| 2,524,523 | Greenberg | Oct. 3, 1950 |